US006976135B1

United States Patent
Talbot et al.

(10) Patent No.: US 6,976,135 B1
(45) Date of Patent: Dec. 13, 2005

(54) MEMORY REQUEST REORDERING IN A DATA PROCESSING SYSTEM

(75) Inventors: Gerry R. Talbot, Concord, MA (US); Austen J. Hypher, Newton, MA (US)

(73) Assignee: Magnachip Semiconductor, Seoul (KR)

( * ) Notice: Subject to any disclaimer, the term of this patent is extended or adjusted under 35 U.S.C. 154(b) by 541 days.

(21) Appl. No.: 09/662,068

(22) Filed: Sep. 14, 2000

Related U.S. Application Data (63) Continuation of application No. 08/808,849, filed on Feb. 28, 1997.

(60) Provisional application No. 60/031,063, filed on Nov. 15, 1996.

(51) Int. Cl.$^7$ ............................................. G06F 12/00
(52) U.S. Cl. ...................... 711/151; 711/158; 711/167; 711/168; 710/39; 710/40
(58) Field of Search ........................ 711/151, 154, 158, 711/167, 168; 710/40, 39

(56) References Cited

U.S. PATENT DOCUMENTS

| 4,590,586 | A | * | 5/1986 | Zenk et al. ................. 711/151 |
| 5,581,729 | A | * | 12/1996 | Nishtala et al. ............ 711/143 |
| 5,642,494 | A | * | 6/1997 | Wang et al. ................ 711/140 |
| 6,026,461 | A | * | 2/2000 | Baxter et al. ............... 710/244 |
| 6,240,458 | B1 | * | 5/2001 | Gilbertson .................. 709/232 |

* cited by examiner

*Primary Examiner*—Donald Sparks
*Assistant Examiner*—Ngoc V. Dinh
(74) *Attorney, Agent, or Firm*—Townsend and Townsend Crew LLP (57) ABSTRACT

Memory transactions are carried out in an order that maximizes concurrency in a memory system such as a multi-bank interleaved memory system. Read data is collected in a buffer memory to be presented back to the bus in the same order as read transactions were requested. An adaptive algorithm groups writes to minimize overhead associated with transitioning from reading to writing into memory.

20 Claims, 11 Drawing Sheets

FIG. 1

(PRIOR ART)

MEMORY REQUEST REORDERING IN A DATA PROCESSING SYSTEM

STATEMENT OF RELATED APPLICATIONS

This application is a continuation of U.S. application Ser. No. 08/808,849, filed Feb. 28, 1997, which claims the benefit of U.S. Provisional Application No. 60/031,063, filed Nov. 15, 1996, both of which are incorporated by reference.

SOURCE CODE APPENDIX

A microfiche appendix of source code for the address reordering portion of a preferred embodiment are filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to data processing systems with memory subsystems. More particularly, the present invention relates to controlling requests to memory subsystems so as to maximize bandwidth and concurrency, thereby increasing overall memory subsystem and data processing system speed.

In modern data processing systems, the speed of memory subsystems can be a major limiting factor on overall system speed. The memory bottleneck exists because a memory access is typically much slower than the speed at which computer processors and data buses can generate and convey memory access requests. The slow speed of memory access is particularly felt when there is a read request, as opposed to a write request, because a read request indicates that a requesting processor may be waiting for data.

The bottleneck caused by low memory speed becomes even more severe as the speed of computer processors increases at a faster rate than the speed of common memory components. The memory bottleneck is also exacerbated as computer system and network architectures are introduced that contain multiple processors which share a memory subsystem.

One conventional approach to alleviate the memory bottleneck is to use data caching, perhaps at various levels within the data processing system. For example, portions of data in a slow, cheap disk memory subsystem may be copied, or "cached," into a faster system RAM (random access memory) subsystem. Portions of data in system RAM may in turn be cached into a "second-level" cache RAM subsystem containing a small amount of expensive, even faster RAM. Portions of data may also be cached into yet faster "first-level" cache memory which may reside on the same chip as a processor. Data caching is a powerful technique to minimize accesses to slower memory. However, at some point, the various levels of memory still need to be accessed. Therefore, whether or not caching is employed, techniques to speed up memory access are still needed.

Attempts to speed up memory access have included the organizing of memory into multiple banks. Under this memory architecture, as a first bank of memory is busy servicing a request to access a memory location in the first bank, a second, available bank can begin servicing the next memory access request if the next request targets a memory location in the second bank. Memory locations may be interleaved among the banks, so that contiguous memory addresses, which are likely to be accessed sequentially, are in different banks.

A problem with the conventional use of memory banks is that successive access requests will still sometimes target addresses within a common bank, even if addresses are interleaved among the banks. In this situation, a conventional memory subsystem must still wait for the common bank to become available before the memory subsystem can begin servicing the second and any subsequent requests. Such a forced wait is wasteful if a subsequent third access request could otherwise have begun to be serviced because the third request targets a different, available memory bank. Furthermore, merely organizing memory into interleaved banks does not address the extra urgency that read requests have versus write requests, as discussed above.

What is needed in the art is a way to control access to memory subsystems so as to maximize bandwidth and concurrency by minimizing the amount of time that memory requests must wait to be serviced. In particular, a way is needed to allow a memory subsystem to begin servicing a request to access an available memory location even if a preceding request cannot yet be serviced because the preceding request targets an unavailable memory location. Furthermore, a way is needed to give extra priority to read requests, which are more important than write requests, especially in "posted-write" systems in which processors need not wait for a memory write to fully complete before proceeding to the next task.

SUMMARY OF THE INVENTION

The present invention provides method and apparatus for increasing the speed of memory subsystems by controlling the order in which memory access requests are scheduled for service.

According to one embodiment of the invention, a method is provided for reordering a plurality of memory access requests, the method including steps of accepting the plurality of requests; selecting a request to access an available memory location, from the plurality of requests; and scheduling the selected request.

According to another embodiment of the invention, the step of selecting a request to access memory includes steps of determining whether a read request to access an available memory location exists, among the plurality of requests, and if so, selecting a read request to access an available memory location; and if not, selecting a non-read request to access an available memory location.

A further understanding of the nature and advantages of the present invention may be realized by reference to the remaining portions of the specification and the drawings.

DESCRIPTION OF SPECIFIC EMBODIMENTS

The present invention is directed to controlling the order in which requested memory operations are scheduled in a data processing system.

Figure 1:
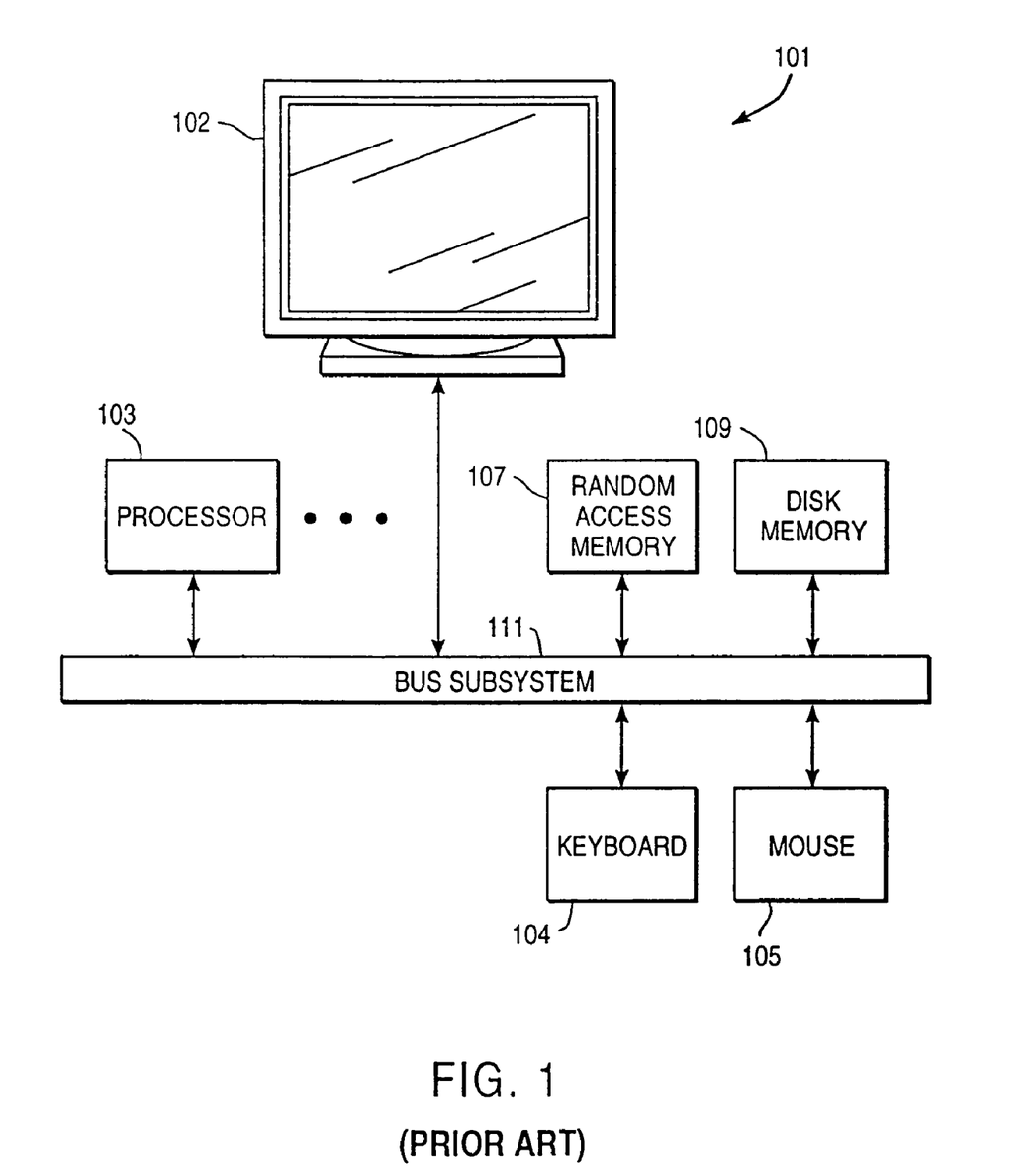
FIG. 1 is a block diagram of a computing system in which the present invention may be embodied.

FIG. 1 is a simplified block diagram of a computing system 101 in which the present invention may be embodied. The computing system configuration illustrated at this high level is standard, and as such, FIG. 1 is labeled "Prior Art." However, a computing system such as system 101, if it includes the present invention for managing access to memory, is not prior art. In accordance with known practice, the computing system 101 includes one or more processors 105 that communicate with a number of peripheral devices via a bus subsystem 111. These peripheral devices typically include memory subsystems such as a random access memory (RAM) subsystem 107 and a disk memory subsystem 109, input facilities such as a keyboard 104 or a mouse 105, and output facilities such as a display 102. Other typical peripheral devices, not shown, include printers, tape memory subsystems, remote, networked server memory subsystems, etc.

In the present context, the term "bus subsystem" is used generically so as to include any mechanism for letting the various components of the system 101 communicate with each other as intended. For example, even though the bus subsystem 111 is shown schematically as a single bus, a typical computing system would have a number of "buses," such as a local bus, one or more expansion buses, serial ports, parallel ports, network connections, etc. In general, components of the computing system 101 need not be at the same physical location.

FIG. 1 is representative of but one type of computing system for embodying the present invention. It will be readily apparent to one of ordinary skill in the art that many computing system types and configurations are suitable for embodying the present invention.

Figure 2A:
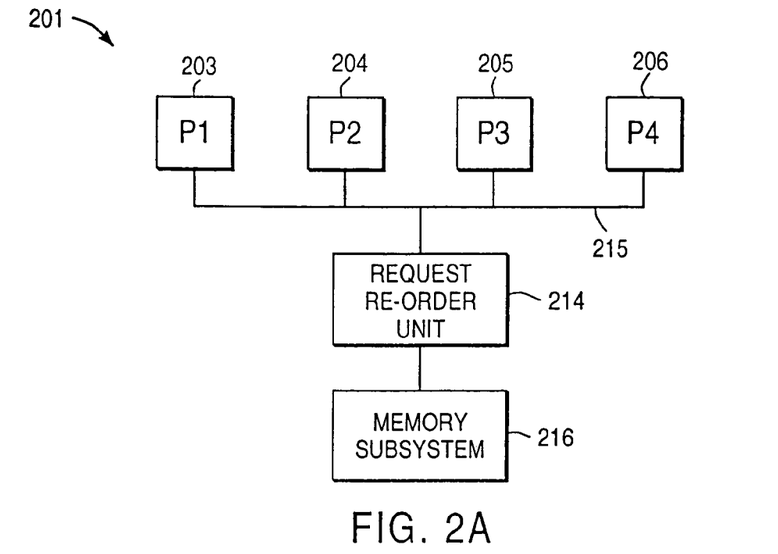
FIG. 2A is a high-level block diagram showing a multiple-processor embodiment of the present invention.

FIG. 2A is a block diagram showing a multiple-processor embodiment 201 of the present invention. The data processing system 201 includes a number of processors, P1–P4, labelled 203, 204, 205, and 206, respectively. The processors are coupled to a memory bus 215. The memory bus 215 is coupled to a memory subsystem 216 through a request reordering unit 214.

The processors P1–P4 generate requests for the memory subsystem 216 onto the memory bus 215. The request reordering unit 214 accepts the requests from the memory bus 215 and schedules the requests according to techniques of the present invention, as will be described below. In some embodiments, the memory bus 215 is an Intel P6 bus; the number of processors is four or less; and the processors are Intel Pentium Pro-compatible processors.

Figure 2B:
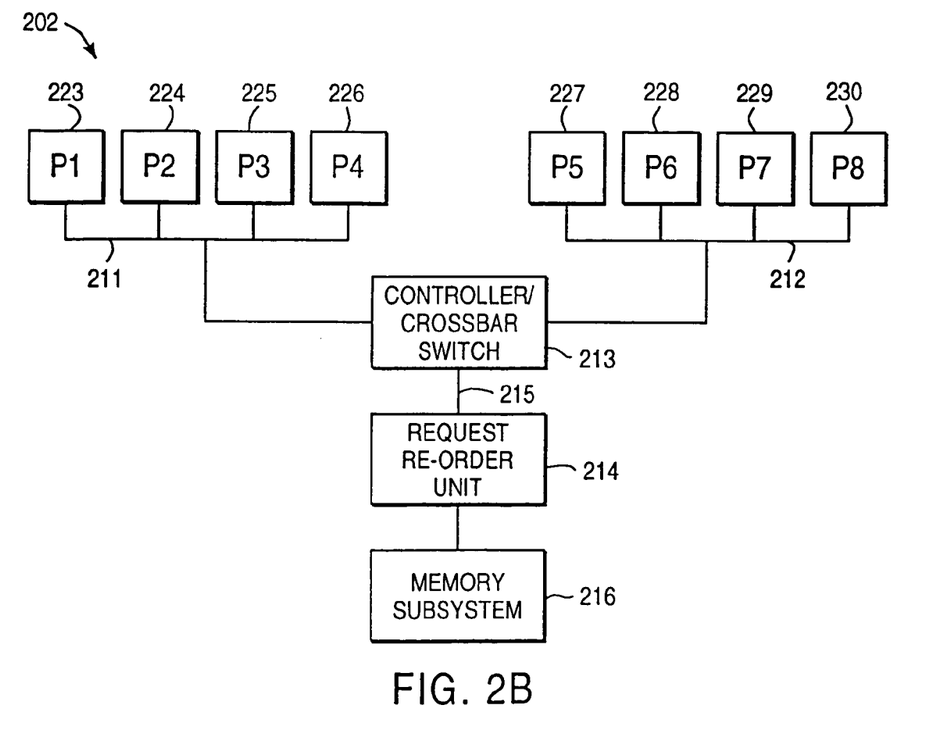
FIG. 2B is a high-level block diagram showing a multiple-processor embodiment of the present invention that includes dual, bridged memory buses.

FIG. 2B is a block diagram showing a multiple-processor embodiment of the present invention that includes dual, bridged memory buses. The data processing system 202 includes a number of processors, P1–P8, labelled 223, 224, . . . , and 230, respectively. The processors P1–P4 are coupled to a first memory bus 211. The processors P5–P8 are coupled to a second memory bus 212. The two memory buses 211 and 212 are bridged by a controller/crossbar switch 213 that performs switching among the two buses and a third bus 215. The third bus 215 is coupled to a memory subsystem 216 through a request reordering unit 214. The buses 211, 212, and 215 may be thought of as belonging to a bus subsystem.

The controller/crossbar switch 213 performs coherency checking and routes instructions required to reflect operations from one of buses 211 and 212 to the other. The processors P1–P4 generate requests for the memory subsystem 216 onto the first memory bus 211. The processors P5–P8 generate requests for the memory subsystem 216 onto the second memory bus 212. The controller/crossbar switch 213 routes memory requests from the two memory buses 211 and 212 to the third bus 215. The request reordering unit 214 receives requests from the third bus 215 and schedules the requests according to techniques of the present invention, as will be described below. In some embodiments, the memory buses 211 and 212 are each Intel P6 buses; the number of processors coupled to each memory bus is four or less, and the processors are Intel Pentium Pro-compatible processors.

Figure 3A:
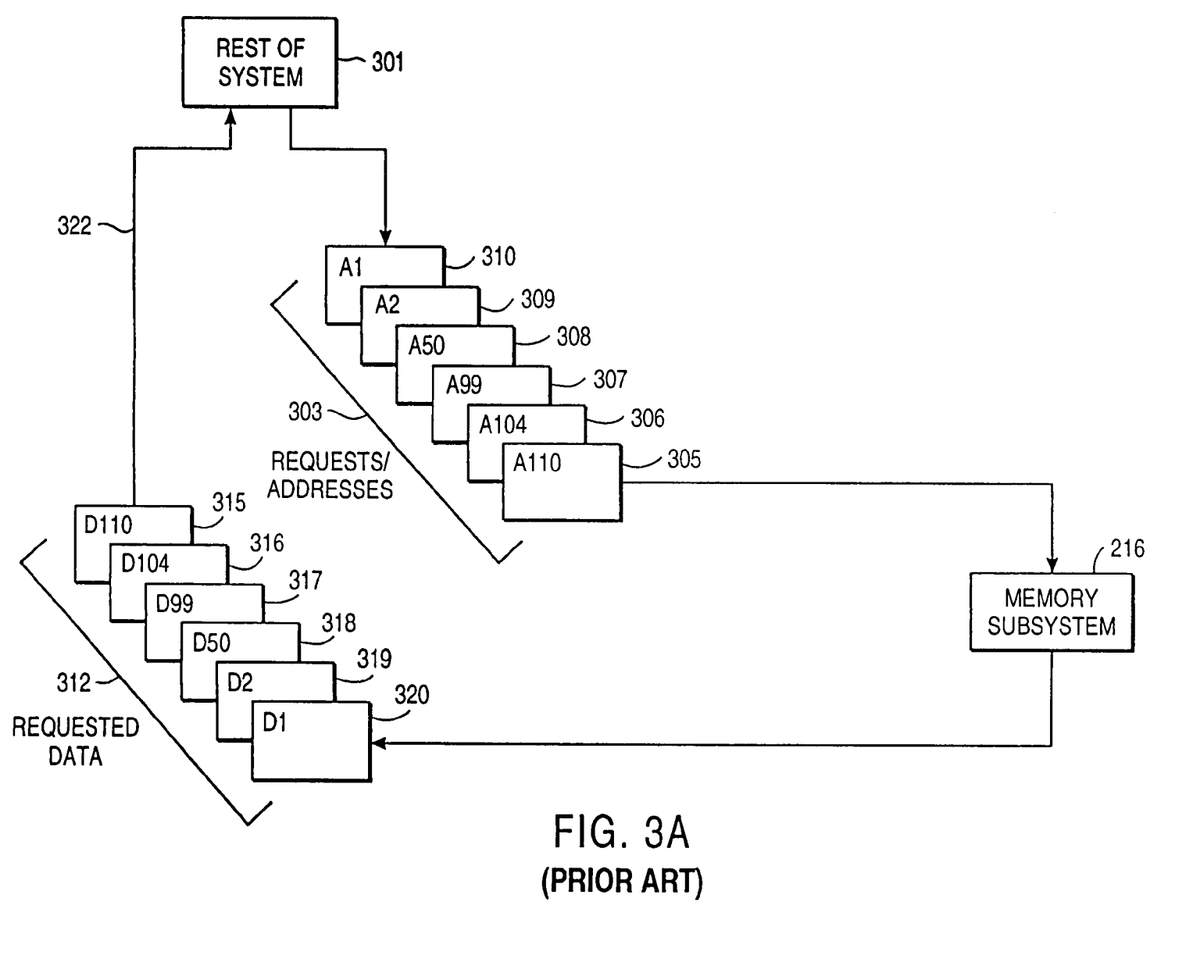
FIG. 3A is a schematic diagram illustrating the ordering of requested memory operations according to the prior art, shown with requested read operations.

FIG. 3A is a schematic diagram illustrating the ordering of requested memory operations according to the prior art, such as discussed in the Background section. For simplicity of illustration only, all shown requested operations are read operations. In FIG. 3A, a plurality of requested memory operations 303, each including a target memory address, are presented to a memory subsystem 216 by a portion 301 of a data processing system. The requests/memory addresses are in an order A110, A104, A99, A50, A2, and A1, labelled 305, 306, . . . , and 310, respectively.

The memory subsystem 216 begins executing each requested operation in order. If the target memory address of a requested operation is available, then the memory subsystem 216 begins executing the requested operation. If not, the memory subsystem waits for the target memory address to become available. This wait may be wasteful in situations such as described in the Background section in which a subsequent requested operation targeting an available address could otherwise begin to be serviced.

Data requested by the requested operations 303 are returned 322 in an order 312 that corresponds to the order of the requested operations 303. In this example, the order 312 of data is D110, D104, D99, D50, D2, and D1, labelled 315, 316, . . . , and 320, respectively.

Figure 3B:
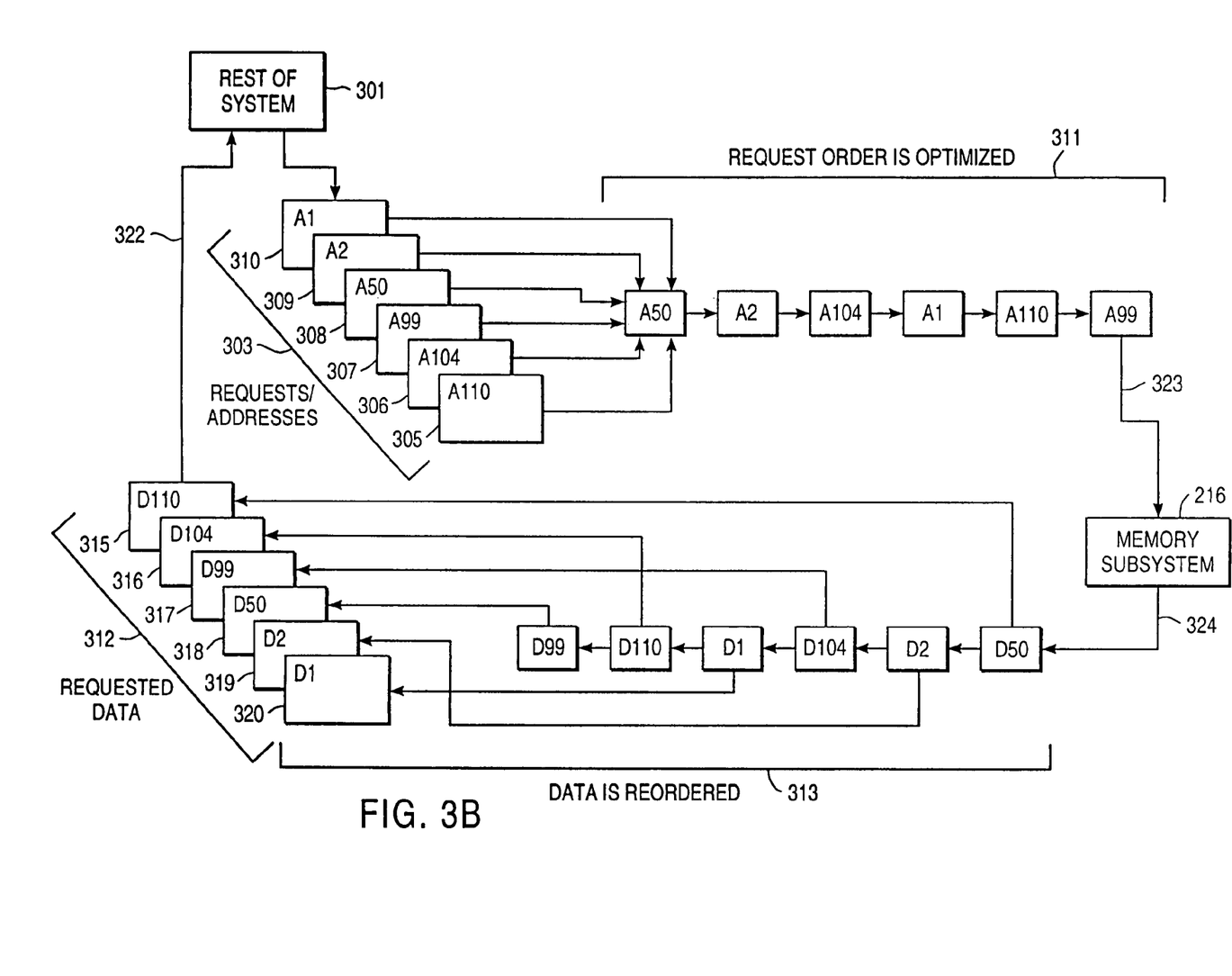
FIG. 3B is a schematic diagram broadly illustrating ordering of requested memory operations in the present invention, shown with requested read operations.

FIG. 3B is a schematic diagram broadly illustrating reordering of requested memory operations in the present invention. For simplicity of illustration only, all shown requested operations are read operations. In FIG. 3B, a plurality of requested operations 303, each including a target memory address, are presented by a portion 301 of a data processing system.

The requests/memory addresses 303 are in an initial order of A110, A104, A99, A50, A2, and A1, labelled 305, 306, . . . , and 310, respectively. These requested operations are submitted 323 to a memory subsystem 216 according to a new ordering 311 for sequential execution. The reordering is performed according to techniques discussed below so as to minimize waiting in the memory subsystem 216 caused by target addresses' not being available. The order of requests/addresses are optimized 311 in this example into an order of A99, A110, A1, A104, A2, and A50.

Data are read 324 from the memory subsystem 216 in the optimized order of D99, D110, D1, D104, D2, and D50. These data are then reordered 313 into an order 312 of D110, D104, D99, D50, D2, and D1, labelled 315, 316, . . . , 320, respectively. The reordered data ordering correspond to the initial request ordering. The reordered data are returned 322. Because data are returned 322 according to the initial request ordering, entities, e.g., processors, not shown, which request memory operations need not be aware of the order in which requested operations were actually executed by the memory subsystem 216.

In FIG. 3B, only requested read operations were shown for ease of illustration. In general, requested operations may also be write operations. Data for writes must be reordered along with the write requests/addresses themselves. In general, steps should be taken to prevent the situation that a requested write followed by a requested read to the same address is reordered so that the read is performed before the write. Such a reordering should be avoided because it would cause the read to return incorrect data. One way to prevent the incorrect reordering is to have the portion 301 of the system not issue write requests followed by read requests until it can be deduced that the write request has already been scheduled. Another way is to allow the portion 301 of the system to issue requests without restriction, and then to actively prevent the situation during the reordering process itself. In the latter way, entities, e.g., processors, not shown, which request the memory operations need not be aware that reordering takes place at all.

Figure 4:
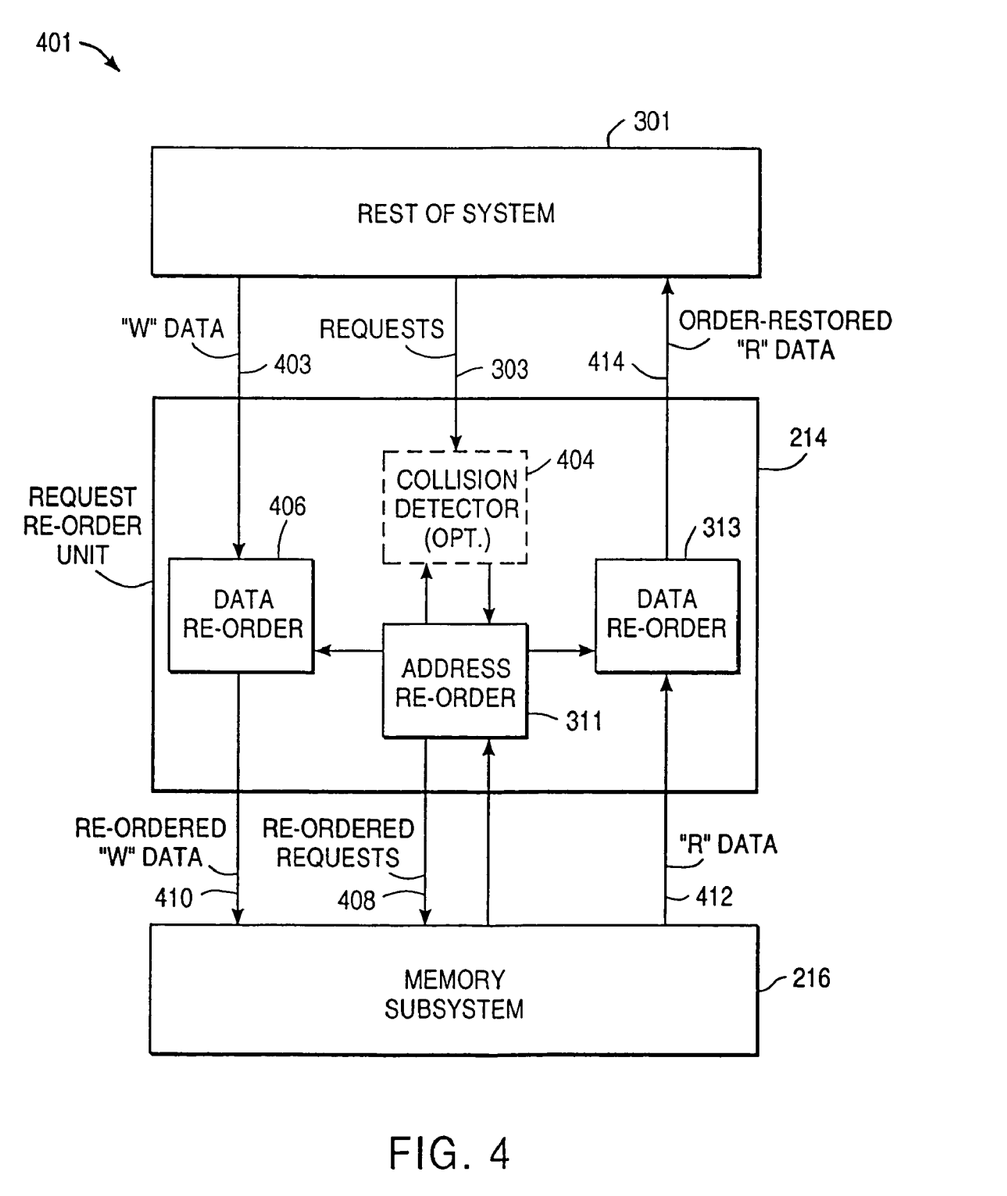
FIG. 4 is a block diagram of an embodiment of the present invention.

FIG. 4 is a functional block diagram of a data processing system 401 embodying the present invention. A portion 301 of the system issues memory access requests 303 and "W" data 403 associated with certain of the requests 303. "W" data are data associated with requested memory operation(s), including data to be written to target memory location(s). The requests 303 and "W" data 403 may issue for example from a bus subsystem (not shown) in the portion 301 of the data processing system, the bus subsystem corresponding to the bus subsystem 111 of FIG. 1.

Within a request reordering unit 214, an address reordering subunit 311 receives the requests 303 and temporarily stores them in a buffer. In embodiments of the invention, the address reordering subunit 311 receives the requests 303 via an optional collision detector 404. Upon entering the address reordering subunit 311, the requests 303 may have an initial ordering. The address reordering subunit 311 submits the requests to a memory subsystem 216 in a new ordering 408 of the requests according to techniques discussed below.

A first data reordering subunit 406 within the request reordering unit 214 receives the "W" data 403. The first data reordering subunit 406, under direction from the address reordering subunit 311, submits the "W" data to the memory subsystem 216 in a new ordering 410 of the "W" data. The new ordering 410 of the "W" data 403 corresponds to the new ordering 408 of the requests 303.

The memory subsystem 216 fulfills the requests and returns any resulting "R" data 412 to the request reordering unit 214. "R" data are data resulting from requested memory operation(s), including data read from target memory location(s).

Within the request reordering unit 214, a second data reordering subunit 313 receives the "R" data and returns 414 them to the portion 301 of the data processing system. If the requests 303 had an initial ordering, the second data reordering subunit 313 restores order to the "R" data 412 prior to returning 414 the "R" data, wherein the restored ordering corresponds to the initial ordering of the requests 303. In embodiments of the present invention, the second data reordering subunit 313 and the first data reordering subunit 406 are implemented in a single unit that is coupled to receive direction from the address reordering subunit 311.

Embodiments of the invention of FIG. 4 typically operate in an ongoing, run-time, dynamic manner. The request reordering unit 214 dynamically accepts new requests and corresponding "W" data. The request reordering unit 214 dynamically submits requests and corresponding "W" data to the memory subsystem 216 according to an optimal new ordering 408 for requests and 410 for corresponding "W" data. The request reordering unit 214 dynamically receives, reorders, and returns "R" data from the memory subsystem 216.

The collision detector 404 of some embodiments of the present invention implements one method for ensuring that reads from an address do not happen until any earlier writes to that address have completed. By so ensuring, the collision detector 404 prevents request reordering from causing the problem discussed above of prematurely and erroneously reading from an address. The collision detector 404 operates as described in the next paragraph to prevent request sequences that can cause the problem discussed above from entering the address reordering subunit 311 in the first place. Other ways for preventing the problem of premature reading would be apparent, based on the teachings herein. For example, in embodiments of the invention that do not have the collision detector 404, the address reordering subunit 311 itself could monitor request sequences and refrain from reversing the order of a write request followed by a read request to the same address.

In the collision detector 404, target addresses of incoming read requests are checked against addresses of all write requests waiting in the address reordering subunit 311. If a read request matches one of the write requests' addresses then that read request is stalled to prevent it from entering the address reordering subunit 311. When the matching write request eventually exits the address reordering subunit 311, on the way to the memory subsystem 216, the "collision" disappears and the read request is allowed to enter the address reordering subunit 311.

Upon entering the request reordering unit 214, the requests may have default priorities that define an initial ordering of the requests. By establishing a new ordering of the requests, the present invention assigns new priorities to the requests. Those requests targeting currently available addresses are assigned high priority.

The requests' default priorities may be determined by arbitrary criteria or heuristic rules. In an embodiment of the invention, older requests are defined as having higher priority than newer requests. The age of a request may be determined, for example, by the time at which the request was issued, the time at which the request is received, or a timestamp associated with the request. In another embodiment of the invention, the default priority is determined by a priority field associated with the request. The default priority may also be influenced by the identity of the entity, e.g., processor, which originally generated the request.

In embodiments of the present invention, the request reordering unit 214 is implemented in software to be executed on a processor. In embodiments of the present invention, the software is stored on a computer program product that includes a computer-readable storage medium. Computer-readable storage media include read only memory (ROM), programmable read only memory (PROM), CD-ROM, hard disk, etc. In embodiments of the present invention, the request reordering unit 214 is configurable by software.

Figure 5:
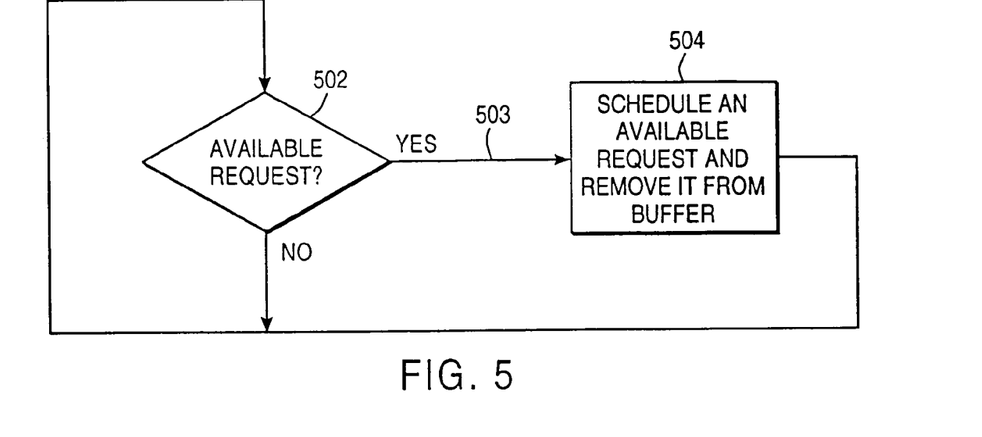
FIG. 5 is a flowchart illustrating request scheduling in embodiments of the present invention.

FIG. 5 is a flowchart illustrating request ordering in the address reordering subunit 311 according to embodiments of the present invention. FIG. 5 is discussed while maintaining reference to FIG. 4. In the embodiments according to FIG. 5, the address reordering subunit 311 determines in step 502 whether a request, of the requests buffered in the reordering subunit 311, targets an available address. If so, 503 the reordering subunit 311 schedules in step 504 such a request into the new ordering 408, and causes the data reordering subunit 406 to schedule 410 any corresponding "W" data accordingly. The scheduled request is removed in step 504 from the address reordering subunit 311. In a preferred embodiment of the invention, the address reordering subunit schedules in step 504 a request that has highest default priority among requests targeting available addresses.

Scheduling a request means that the request is entered into a queue of requests for delivery to the memory subsystem 216. In a preferred embodiment of the invention, the length of the queue is zero, and requests are submitted to the memory subsystem 216 as soon as they are scheduled.

In embodiments of the invention, the memory subsystem includes banks of memory, and a memory address is available when the bank in which it exists is available. In embodiments of the invention, the memory subsystem includes banks of memory with interleaved addresses and a memory address is available when the bank in which it exists is available. The present invention is especially suited to controlling accesses to memory subsystems that include banks of memory. The present invention is also especially suited to controlling accesses to memory subsystems that include banks of memory with interleaved addresses. The present invention is also especially suited to controlling accesses to such memory subsystems that are semiconductor memory subsystems or memory subsystems of similar or higher speed.

Figure 6A:
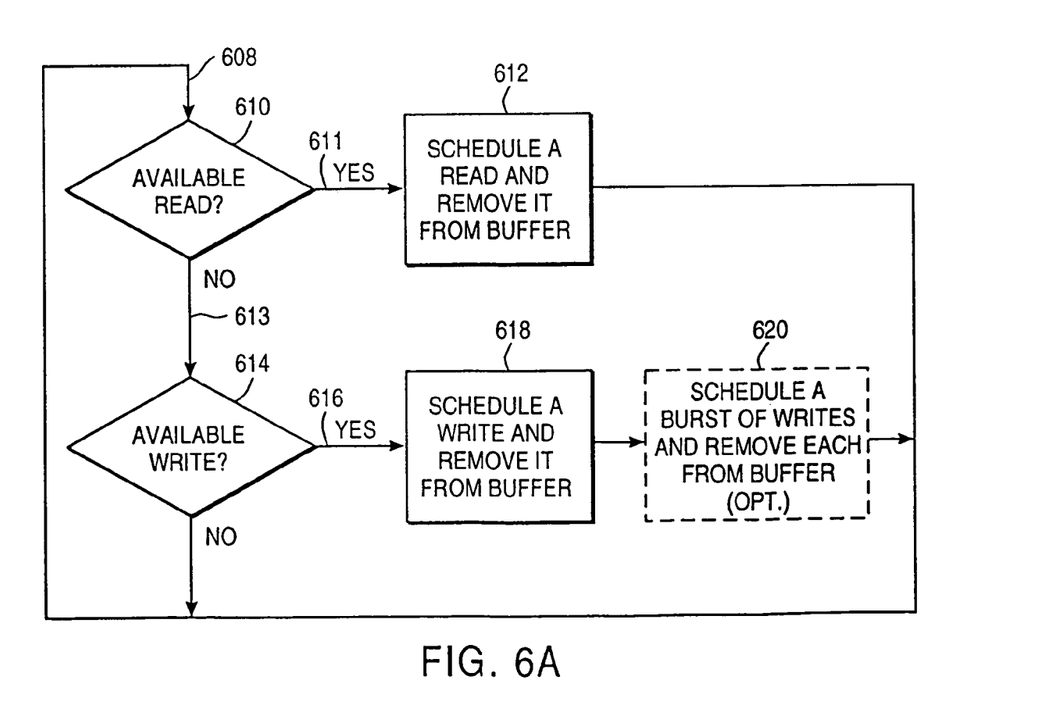
FIG. 6 is a flowchart illustrating request scheduling in read-favoring embodiments of the present invention.

FIG. 6A is a flowchart illustrating request scheduling in embodiments of the present invention that favor read requests over write requests. As discussed in the Background section, it is particularly important to handle read requests as quickly as possible because a read request indicates that a requesting processor may be waiting for data. Therefore, a read request is a more-critical type of request than other operations, e.g., a write operation. FIG. 6A is discussed while maintaining reference to FIG. 4.

In the embodiments according to FIG. 6A, the address reordering subunit 311 first determines in step 610 whether a read request, of the requests buffered in the reordering subunit 311, targets an available address. If so, 611 the address reordering subunit 311 schedules in step 612 such a read request into the new ordering 408. In a preferred embodiment of the invention, the address reordering subunit schedules in step 612 a request that has highest default priority among read requests targeting available addresses. The scheduled read request is removed from the reordering subunit 311 in step 612.

If step 610 determines that no read request in the reordering subunit 311 targets an available address, 613 the reordering subunit 311 determines in step 614 whether a write request of the requests in the reordering subunit 311 targets an available address. If so, 616 the address reordering subunit 311 schedules in step 618 such a write request into the new ordering 408, and causes the data reordering subunit 406 to schedule 410 any corresponding "W" data accordingly. In a preferred embodiment of the invention, the address reordering subunit schedules in step 618 a request that has highest default priority among write requests targeting available addresses. The scheduled write request is removed from the reordering subunit 311 in step 618.

In many memory subsystems, a write request cannot be scheduled immediately after a read request is scheduled because of potential bus contention in the memory subsystem between the write data entering the memory subsystem and the read data exiting the memory subsystem. When the present invention is used to control access to such memory subsystems, this possible contention should be taken into account. One way to prevent possible contention is to modify step 614 to ask not only whether a write request exists that targets an available address, but also whether the write data path is clear. The write-path may be determined to be clear, for example, if the previously scheduled request was not a read request or if a sufficient time gap has been ensured between the execution time of the previously scheduled request and that of the write request in question. Only if a write request exists and the write-path is clear 616 would the write request be scheduled in step 618.

In memory subsystems as described in the previous paragraph, time is lost during bus turnarounds, or rapid transitions from handling a read request to handling a write request. In order to reduce the amount of time lost, embodiments of the present invention include the optional burst-write step 620 after step 618 to minimize bus turnarounds. The burst-write step 620 implements the behavior that, once a write request is scheduled, in step 618, then a burst of write requests are successively scheduled in step 620. In this sense, write requests are a "burstable" type of operation because they benefit from being grouped together.

Figure 6B:
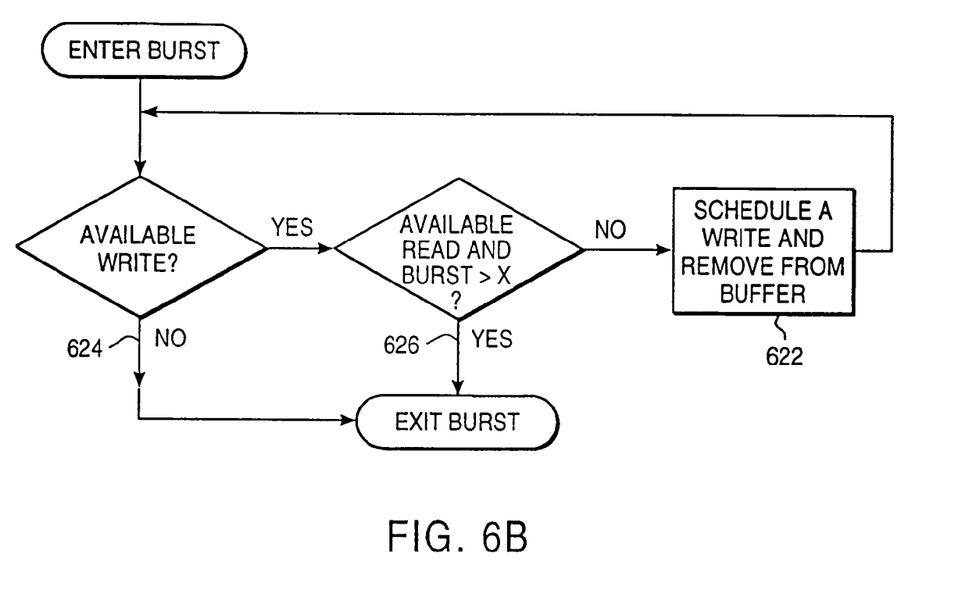

FIG. 6B is a flowchart illustrating the burst-write step of FIG. 6A. FIG. 6B is largely self-explanatory. As can be seen, write requests to available addresses are scheduled in step 622 until either 624 no more write requests exist that target available addresses or 626 a predefined number X of write requests have been scheduled in the current burst and a read request exists that targets an available address. In an embodiment of the present invention, the number X is adjusted based on system requirements. In a preferred embodiment of the present invention, the number X is programmable. For example, the value of X might be stored in a register by a software program, dip switches, or the like. A value of four for X has been found to work well in an embodiment of the invention with eight Intel Pentium Pro processors as shown in FIG. 2B.

Figure 7:
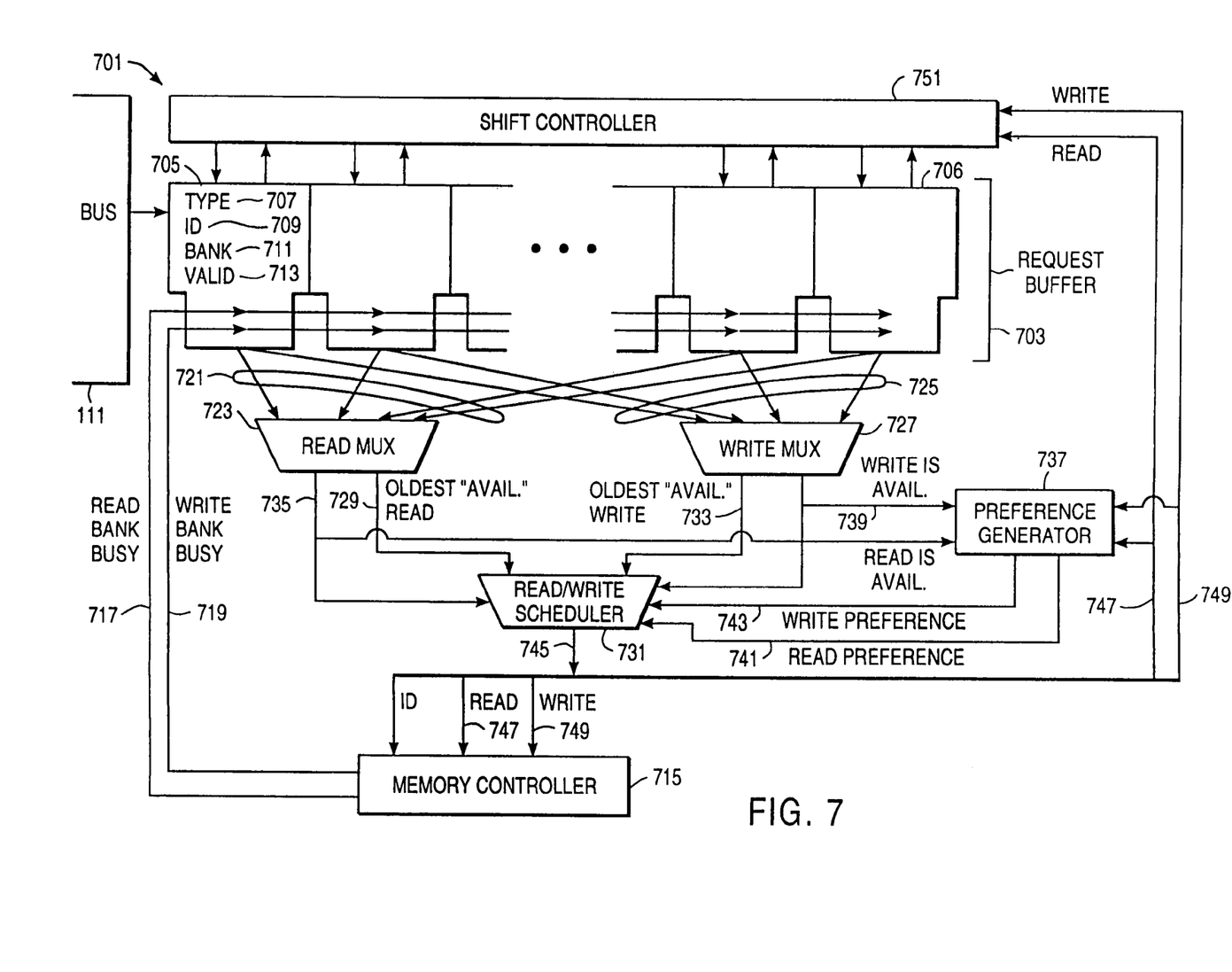
FIG. 7 is a circuit block diagram illustrating an embodiment of the present invention.

FIG. 7 is a circuit block diagram illustrating an embodiment 701 the present invention that controls requests to an interleaved multi-bank memory system. In FIG. 7, a bus 111 sends memory requests to the input end 705 of a shift buffer called the request buffer 703.

The request buffer 703 has a number of elements, such as element 705, that can each store one request. A buffer with eight elements has been found to be suitable in an eight-Pentium Pro processor embodiment of the present invention. Within an element, a request is stored as a "type" 707, an "ID" 709, and a "bank" 711. A request's type 707 may take values of "read" or "write." A request's ID 709 specifies the target address of the request. In an embodiment of the invention, a request's ID is not itself an address, but is an index, i.e., pointer, into an address buffer (not pictured) that holds addresses. A request's bank 711 is the bank of memory to which the target address belongs. Each element also contains a "valid" bit 713 that tells whether that element currently contains a request.

The request buffer 703 is coupled receive information from a memory controller 715 indicating which banks of memory are currently available for reads 717 or for writes 719. Based on the information regarding which banks are available, the request buffer determines which of the requests target available addresses. The request buffer 703 presents 721 all read requests targeting available addresses to a read MUX 723. The request buffer 703 presents 725 all write requests targeting available addresses to a write MUX 727.

The read MUX 723 presents the oldest read request 729 of the target-available read requests 721 to a read/write scheduler 731. The read MUX 723 also generates an "available read" flag 735 that indicates existence of the oldest target-available read request 729. The read/write scheduler 731 and a preference generator 737 receive the "available read" flag 735.

The write MUX 727 presents the oldest write request 733 of the target-available write requests 725 to the read/write scheduler 731. The write MUX 727 also generates an "available write" flag that indicates existence the oldest target-available write request 733. The read/write scheduler 731 and the preference generator 737 receive the "available write" flag 739.

The read/write scheduler 731 and the preference generator 737 together implement the reordering rules of the embodiment 701. At a high level, the reordering rules of the embodiment 701 are as described above in connection with FIGS. 6 and 6B.

The preference generator 737 determines a current preference 741 for read requests or a current preference 743 for write requests, as will be described below. Based in part on the current preference, the read/write scheduler 731 schedules 745 either the oldest target-available read request 729 or the oldest target-available write request 733, as will be described below. Once a request is scheduled 745, the memory controller 715 accepts the request, and the preference generator 737 and a shift controller 751 are made aware of whether a read 747 or a write 749 request was just scheduled.

The shift controller 751 is coupled to know the contents of the request buffer 703. After a request has been scheduled, the shift controller 751 removes that request from the request buffer 703. To do this, the shift controller 751 performs two functions. First, the shift controller 751 deduces which request was the one that was just scheduled by identifying the oldest target-available request that matches the type of request just scheduled (i.e., read type 747 or write type 749). Second, the shift controller 751 instructs the request buffer 703 to shift all requests older than the just-scheduled request by one element, away from the input end 705 (i.e., newer end) of the request buffer 703.

As mentioned above, the request buffer 703 is constructed as a shift register, with a younger end 705 and an opposite, older end 706. Age of entry of requests into the buffer 703 necessarily increases from the younger end 705 toward the older end 706. Flow within the request buffer 703 is controlled using the following rules for each element X of the buffer, applied simultaneously to all elements. The effect of these rules is that the request buffer 703 shifts its contents to fill unoccupied elements, thereby maximizing availability of younger elements for filling at the younger input end 705.

Rule 1: if element X, or an older element is unused then the content of element X is replaced by the content of the adjacent, younger element.

Rule 2: if element X, or an older element, is being scheduled to go the memory system then the content of element X is replaced by the content of the adjacent, younger element.

Rule 3: if the conditions of both Rule 1 and Rule 2 are false then the content of element X remains unchanged.

The embodiment 701 assumes that no active write request to an address is followed by an active read request to the same address because the embodiment 701 is designed to work with a collision detector 404, not shown in FIG. 7. Embodiment 701 can be modified so as not to make the assumption, by adding collision detecting logic to the request buffer 703.

Figure 8A:
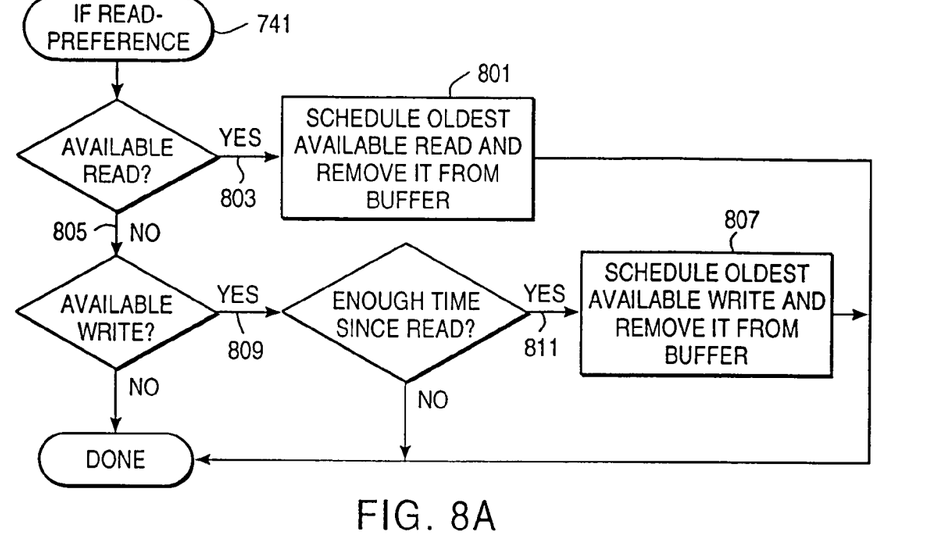
FIGS. 8A and 8B are flowcharts illustrating request scheduling in the read/write scheduler of FIG. 7.

FIG. 8A is a flowchart illustrating request scheduling in the read/write scheduler 731 of FIG. 7, given a current preference for reads 741. In FIG. 8A, an oldest read request is scheduled 801 if it targets an available address 803. Otherwise, 805 an oldest write request is scheduled 807 that targets an available address 809 if enough time has passed 811 since the previous read request was scheduled for the write path to be clear.

Figure 8B:
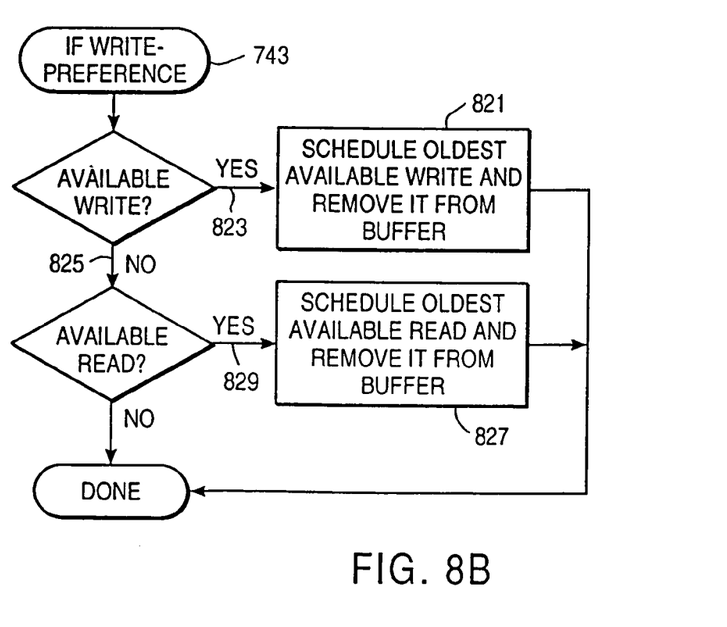

FIG. 8B is a flowchart illustrating request scheduling in the read/write scheduler 731 of FIG. 7, given a current preference for writes 743. In FIG. 8B, an oldest write request is scheduled 821 if it targets an available address 823. Otherwise, 825 an oldest read request is scheduled 827 that targets an available address 829.

Figure 9A:
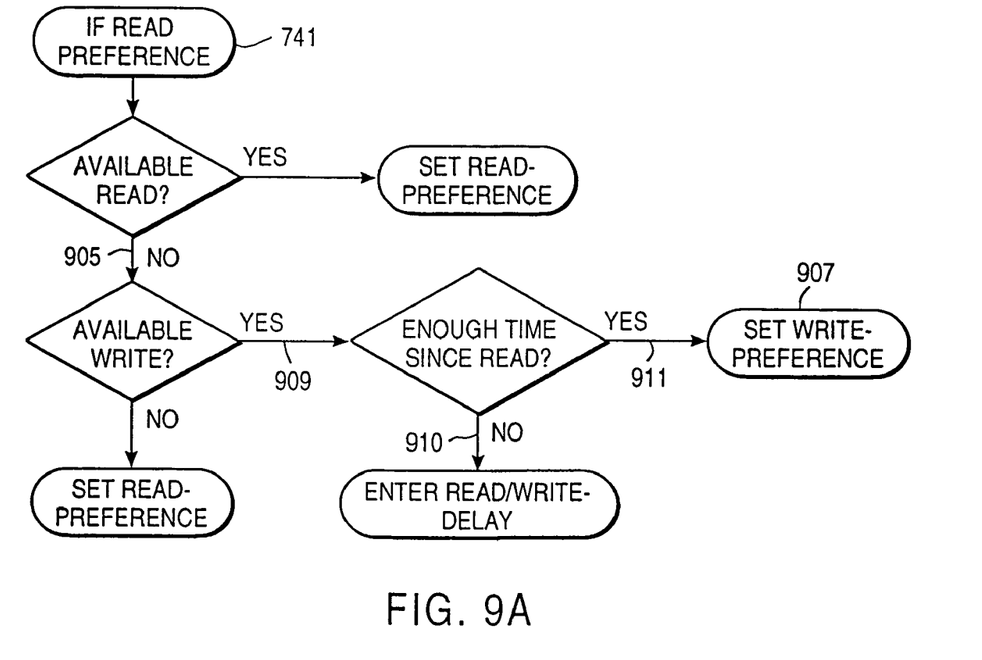
FIGS. 9A, 9B, and 9C are flowcharts illustrating read/write preference generation in the preference generator of FIG. 7.
Figure 9B:
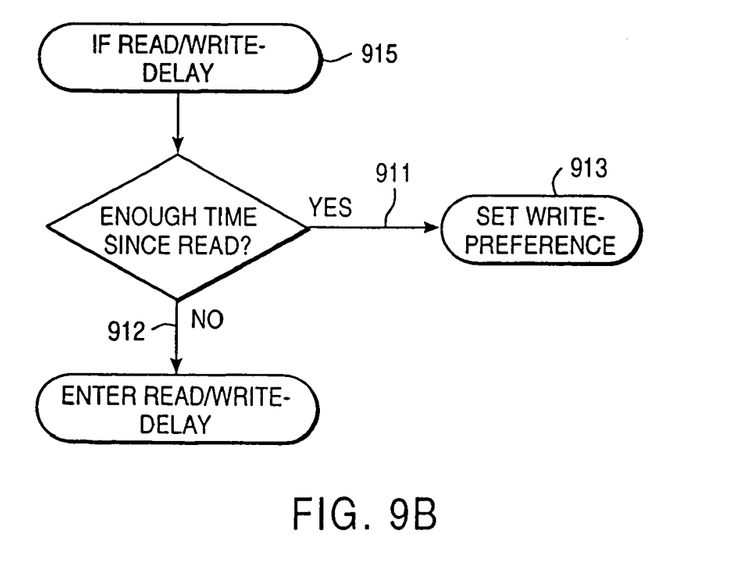
Figure 9C:
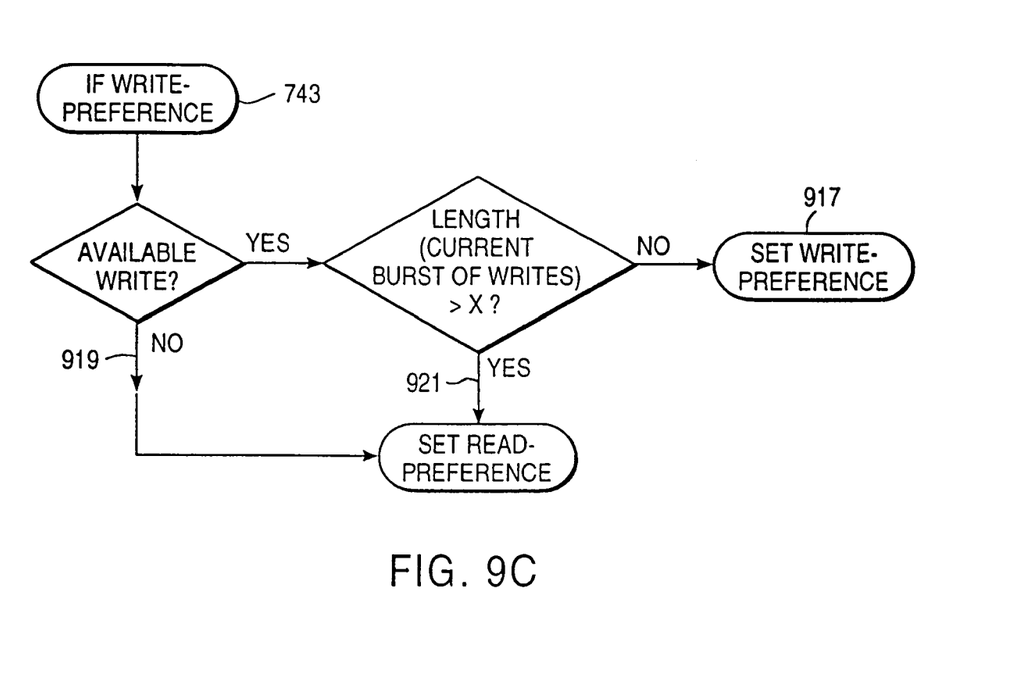

FIGS. 9A, 9B, and 9C are flowcharts illustrating read/write preference generation in the preference generator 737 of FIG. 7. As can be seen from FIG. 9A, a current preference for reads 741 will be changed 907, 913 into a preference for writes if and only if no target-available read request exists 905 and a target-available write request exists 909. If necessary, 910, 912 the preference generator will wait 915 before establishing a current preference for writes 913. The wait is to ensure a clear write path by letting enough time elapse 911 after a previous read request was scheduled. During the wait, neither a preference for writes nor a preference for reads is asserted—i.e., the preference is indeterminate.

As can be seen from FIG. 9C, once a current preference for writes 743 is asserted, it will remain asserted 917 until either no target-available write request exists 919 or a predetermined number X of writes has been consecutively written 921. A value of four for X has been found to work well in an eight-Pentium Pro embodiment of the present invention.

While the above is a complete description of specific embodiments of the invention, various modifications, alternative constructions, and equivalents may be used. Therefore, the above description should not be taken as limiting the scope of the invention as defined by the claims and their full scope of equivalents.

SOURCE CODE APPENDIX

The microfiche source code appendix includes source code to implement one instantiation of the present invention. The source code is in the Verilog hardware description language which is used in industry to describe circuits. When compiled with a suitable compiler, the source code allows simulation of the invention. Suitable compilers include Turbo-Verilog, available from Cadence Design Systems, which will run on, for example, a Sparc workstation from Sun Microsystems. The subset of Verilog used in the source code allows synthesis into gates, using standard synthesis tools from Synopsys, Inc., and thence embodiment into the integrated circuit (IC) technology of choice.

What is claimed is:

1. In a data processing system, a method for ordering a plurality of memory access requests from a plurality of data processors, the method comprising:
   accepting the plurality of memory access requests in an initial order sequence;
   determining whether there are available target memory addresses associated with the plurality of memory access requests;
   determining whether each of the plurality of memory access requests are read requests or write requests;
   determining the age of each of the plurality of memory access requests;
   determining an order of precedence based on the available target memory addresses, whether the plurality of memory access requests are read requests or write requests, and the age of each of the plurality of memory access requests, wherein a first precedence is given to the memory access requests having available target memory addresses, a second precedence is given to the memory access requests that are read memory requests, and a third precedence is given to the memory access requests that are newer in age;
   reordering the initial order to a new order based on the order of precedence without regard to a status of the plurality of data processors;
   servicing the plurality of memory access requests; and
   reordering a data exchange resulting from the plurality of memory access requests in the initial order sequence.

2. In a computer system, a method for processing a plurality of memory access requests from a plurality of processors, the method comprising:
   receiving the plurality of memory access requests in an initial queue;
   reordering the memory access requests according to a predetermined precedence order defined by a set of rules, without regard to the state of the plurality of processors, wherein the rules comprise:
      establishing a first precedence for any of the plurality of memory access requests that have a corresponding available target address;
      establishing a second precedence for any of the plurality of memory access requests that are read requests;
      establishing a third precedence for any of the plurality of memory access requests based on age of the plurality of memory access requests; and
      servicing the plurality of memory access requests.

3. The method of claim 2 wherein the reordering provides for at least two memory access requests with available target memory addresses.

4. The method of claim 2 wherein the servicing is done sequentially.

5. The method of claim 2 wherein the queue is a priority queue, wherein a first memory access requests with the first precedence is executed before a second memory access request having the second precedence, and a third memory access request is processed after any of the memory requests with the first precedence or any of the memory requests with the second precedence.

6. The method of claim 2 wherein said the reordering results in a queue having a first memory access request with an available target memory address preceding a second memory access request with an unavailable target memory address.

7. The method of claim 2 further comprising, after the servicing of said plurality of memory access requests, returning results of the servicing according to a received order of said plurality of memory access requests by the initial queue.

8. A data processing system that reorders memory access requests from a plurality of data processors, the system comprising:
   a request buffer for holding a plurality of memory access requests received in a first order;
   an availability determiner for determining availability of memory locations requested by said plurality of memory access requests; and
   a reordering unit configured to reorder the first order of the plurality of memory access requests into a second order, without regard to a status of the plurality of the processors, the second order based on a first precedence of available memory locations, a second precedence based on a type of memory request, and a third precedence based on ages of the memory access requests, the reordering unit configured to reorder, the reordering unit responsive to the availability unit to determine the first precedence; and
   a collision detector configured to prevent a read memory request from occurring before a write memory request has completed.

9. The method of claim 8 further comprising an execution unit for executing the plurality of memory access requests based on the second order.

10. A priority queue in a computer system for determining an execution order for executing a plurality of memory access requests from a plurality of processors, the priority queue comprising:
    a memory unit for storing the plurality of memory access requests in a receiving order; and
    an ordering module for determining the execution order from the receiving order,
    the ordering module configured to determine the availability of target memory locations, whether the memory access requests includes a read memory request or a write memory request, and the age of the requests, the ordering module configured to reorder the receiving order into the execution order wherein any memory requests with available target memory locations take precedence over any other memory requests with unavailable target memory, wherein read memory requests take precedence over any write memory request, and where older memory requests take precedence over younger memory requests, regardless of the state of the plurality of processors.

11. The method of claim 10 wherein the plurality of memory access requests comprises at least three memory access requests.

12. The method of claim 10 further comprising an execution unit for executing sa the plurality of memory access requests in the execution order.

13. The method of claim 12 further comprising a results ordering module for returning results of the execution unit according to the receiving order.

14. In a data processing system, a method for ordering a plurality of memory access requests from a plurality of processors, the method comprising:
   accepting the plurality of memory access requests;

determining an initial order of the plurality of memory access requests, determining an order of execution precedence based on available target memory location, type of memory access requested, and an age of the memory access request;

reordering the initial order of the plurality of memory access requests with respect to the execution preference, wherein the plurality of processors are unaware of the reordering; and after the reordering, servicing any of the plurality of memory access requests according to the execution preference.

15. In a computer system, a method for processing a plurality of memory access requests from a plurality of processors, the method comprising:

receiving the plurality of memory access requests;

determining any available target memory address associated with the plurality of memory access requests;

determining if any of the memory access requests are read requests or write requests;

determining the age of each of the plurality of memory access requests;

comparing the available target addresses of any read requests to the target addresses of any write requests;

reordering the plurality of memory access requests without regard to the status of the plurality of processors, such that the first memory access requests for servicing are those with available target memory, the second memory access requests for servicing are read and write requests, wherein read requests follow write requests that are requesting access to an identical target address, and the third memory access requests for servicing are based on age of the memory access request; and after the reordering, servicing said plurality of memory access requests.

16. The method of claim 15 wherein the servicing is done sequentially.

17. The method of claim 1 wherein the status of the plurality of data processors comprises being unaware of the reordering.

18. The method of claim 1 wherein the second precedence comprises only allowing a read memory request to execute after a write request has cleared from an identical target memory address being requested for the read memory request.

19. The method of claim 14 wherein determining the order of execution precedence based on available target memory location comprises giving precedence to those plurality of memory access requests that have an available target memory to access.

20. The method of claim 14 wherein determining the order of execution precedence based on the type of memory access requested comprises giving precedence to those plurality of memory access requests that are read requests that do not have a write request to an identical target memory address.

* * * * *